United States Patent [19]
Reinicke et al.

[11] Patent Number: 5,083,744
[45] Date of Patent: Jan. 28, 1992

[54] MOTOR-OPERATED VALVE

[75] Inventors: Robert H. Reinicke, Mission Viejo, Calif; Kevin F. Oliver, Northport, N.Y.

[73] Assignee: Morotta Scientific Controls, Inc., Montville, N.J.

[21] Appl. No.: 666,375

[22] Filed: Mar. 8, 1991

[51] Int. Cl.$^5$ ............................................. F16K 31/04
[52] U.S. Cl. ........................ 251/129.11; 251/129.12; 137/554; 137/486; 137/487.5; 335/230; 335/272
[58] Field of Search ...................... 251/129.12, 129.11; 137/554, 486, 487.5; 335/230, 272

[56] References Cited
U.S. PATENT DOCUMENTS

| | | |
|---|---|---|
| 4,577,832 | 3/1986 | Sogabe .................. 251/129.12 X |
| 4,647,009 | 3/1987 | Idogaki et al. ................ 251/129.12 |
| 4,895,344 | 1/1990 | Brand et al. .............. 251/129.12 X |

Primary Examiner—Arnold Rosenthal
Attorney, Agent, or Firm—Hopgood, Calimfade, Kalil, Blaustein & Judlowe

[57] ABSTRACT

The invention contemplates a rotary valve which uses a brushless DC-motor to directly drive the flow control member of the valve. The motor is of toroidal-torque variety, with a wound stator that is fixed to the valve body, and a rotor which is fixed to the valve member. In a first embodiment, one polarity of transient stator excitation drives the rotor in one direction, from one to the other magnetically latched end of a limited angular excursion, and the opposite polarity of transient stator excitation drives the rotor in the opposite direction, to reverse the magnetically latched condition of the rotor and, therefore, of the valve member. In a second embodiment, a torsion spring is connected to apply torque in opposition to rotor displacement from one of the limits of its angular excursion, and the extent to which the valve member is operated is a function of the instantaneous magnitude of stator excitation.

20 Claims, 4 Drawing Sheets

MOTOR-OPERATED VALVE

BACKGROUND OF THE INVENTION

The invention relates to valves for control of fluid flow, wherein a valve member is operated via a brushless DC motor actuator that is integrated with the valve member.

Related Pat. Nos. 4,892,286 and 4,930,746 disclose technology wherein an integrated brushless DC motor-actuator directly operates a fluid-flow control element. These patents are concerned with techniques to convert the rotary motion and torque of the motor into axial motion and force, to actuate a poppet-style flow-control element. These patents require continuous application of electrical power in at least one valve position, so that these patented valves are at a disadvantage in situations wherein only an absolute minimum of electric-power consumption is to be tolerated. Moreover, the mechanical structure to accomplish conversion of rotary to axial displacement is relatively complex, expensive and unduly dependent upon manufacturing tolerances.

BRIEF STATEMENT OF THE INVENTION

It is an object of the invention to provide an improved valve construction of the character indicated.

It is a specific object to provide a valve wherein a brushless DC motor-actuator directly positions a rotary-style flow-control element or valve member.

It is another specific object to meet the above objects with a construction requiring power only when actuated, i.e., only during the time that it takes to angularly displace a directly coupled valve member over a limited angular excursion.

Another specific object is to provide magnetic latching of positions achieved by transient DC motor-actuated displacement of the flow-control element of a valve meeting the foregoing objects.

Still another object is to provide, in such a valve, magnetically sensitive means for externally indicating the instantaneous positional state of an involved valve member.

It is also a specific object to provide an improved motor-actuated valve construction which, with only minor modification, lends itself to assembly to serve a variety of different operational functions, namely, a latching-type two-position valve, or a valve wherein controlled flow is a precharacterized function of motor torque.

It is a general object to achieve the above objects with simple, cost-effective construction, which lends itself to reliable operation in the handling of corrosive fluids.

The invention achieves the above objects in a motor-operated valve comprising a body having inlet and outlet ports to a bore on a central axis, and a valve member is journalled in the body for rotation about the central axis. In a first rotary position, the valve member establishes a maximum-flow passage between the ports, and in a rotary position offset from the first rotary position the valve member establishes a minimum-flow passage between the ports. A toroidal-torque motor centered on the central axis has a wound stator fixed to the body, and a rotor within the stator is angularly fixed in its connection to the valve member, to directly impart rotation to the valve member over a limited angular excursion between the two rotary positions.

In a first embodiment, one polarity of transient stator excitation drives the rotor in one direction, from one to the other magnetically latched limit of the angular excursion; and the opposite polarity of transient stator excitation drives the rotor in the opposition direction, to reverse the magnetically latched condition of the motor and, therefore, of the valve member. In a second embodiment, a torsion-spring is connected to apply torque in opposition to rotor displacement from one of the limits of its angular excursion, and the extent to which the valve member is operated is a function of the instantaneous magnitude of stator excitation.

DETAILED DESCRIPTION

The invention will be described in detail for preferred and illustrative embodiments, in conjunction with the accompanying drawings, in which.

Figure 1:
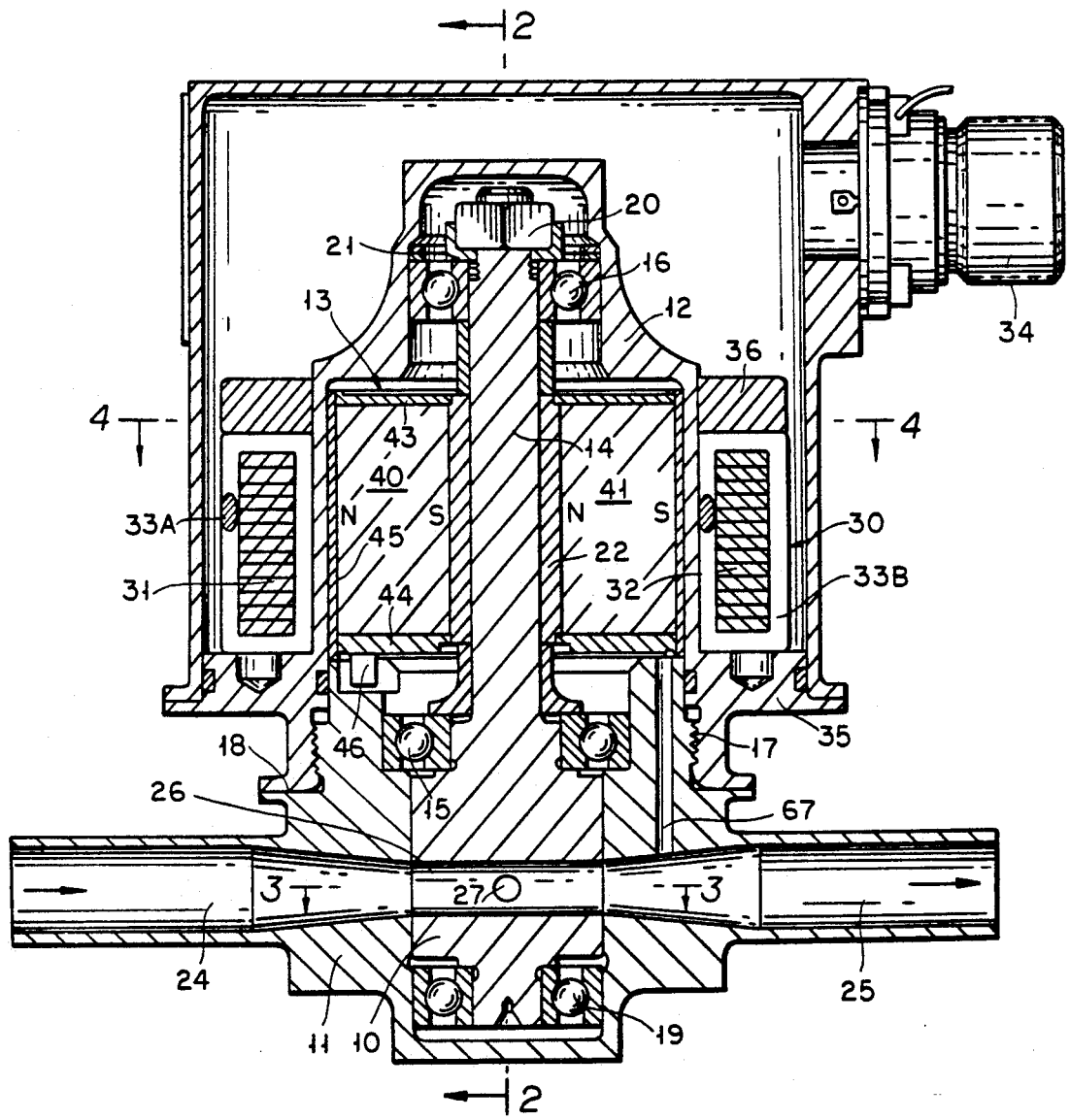
FIG. 1 is a vertical section of a rotary valve of the invention, shown for its condition of permitting maximum flow.

In FIGS. 1 to 6, the invention is shown in application to a two-position valve wherein a valve member or plug 10 is rotatable within the bore of the lower part 11 of a two-part valve body. The upper part 12 of the valve body contains the rotor 13 of a brushless DC motor. The valve member 10 is integrally formed with an elongate stem 14 to which rotor 13 is assembled for keyed rotation of the valve member about the central axis of the valve, and antifriction bearings 15, 16 on axially opposite sides of the rotor 13 provide journalled support in the respective halves 11, 12 of the valve body. As shown, the body halves 11, 12 are threadedly engaged at 17 against abutting shoulders at 18, and a third antifriction bearing 19 provides additional journalled body support of the lower axial end of the valve member. A nut 20, engaged to threads at the reduced upper end of stem 14, clamps a keying washer 21 and a succession of annular sleeves and spacers (including the inner-race rings of bearings 15, 16, and a sleeve part 22 of rotor 13) in tight compression against a shoulder 23 of valve member 10, thus assuring a permanently keyed relation of the rotor to the valve member.

Figures 2, 3, 3A:
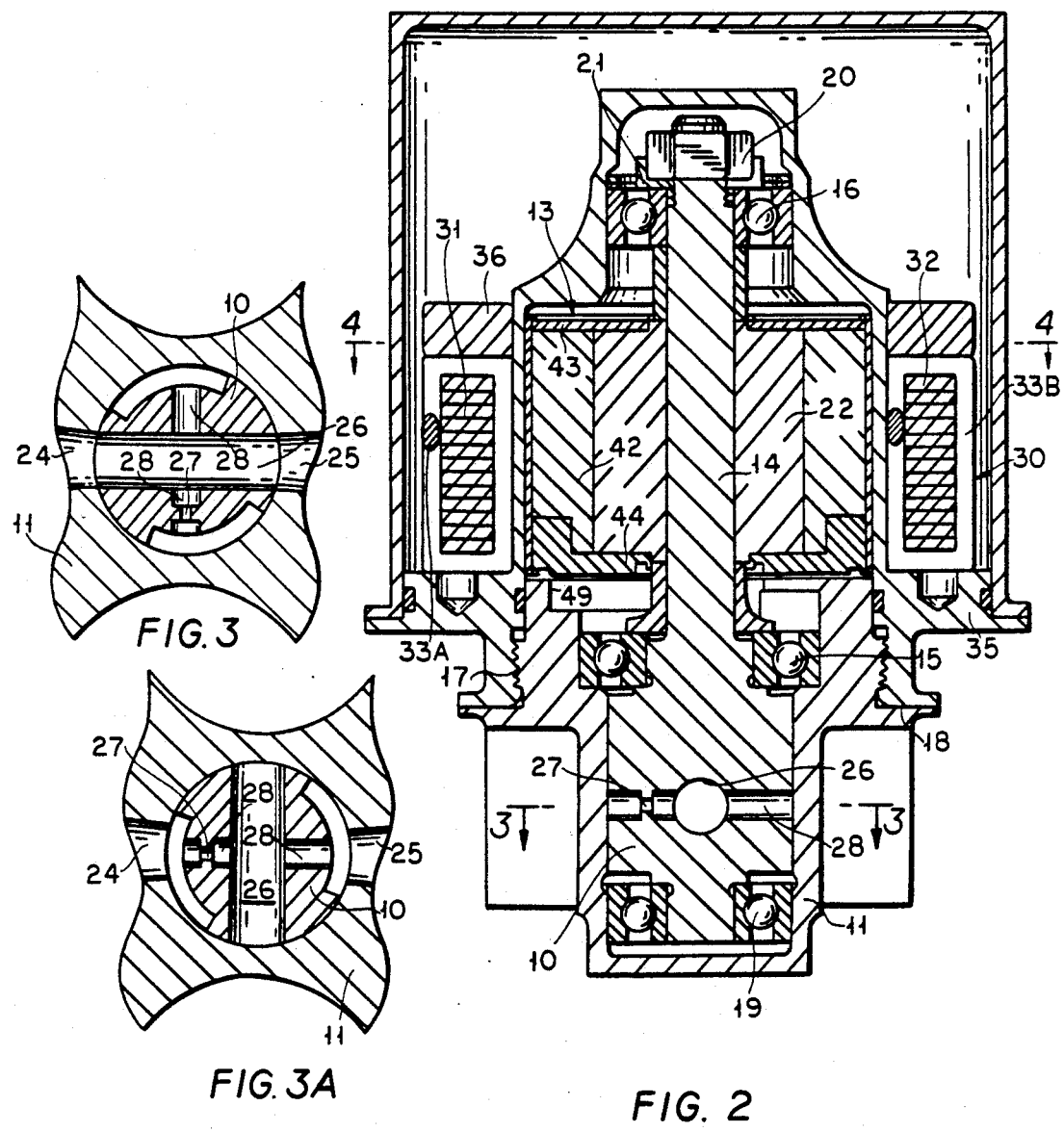
FIG. 2 is another vertical section taken in the orthogonally related plane, designated 2—2 in FIG. 1.
FIG. 3 is a fragmentary sectional detail, taken at 3—3 in FIG. 1.
FIG. 3A is a sectional detail as in FIG. 3, to show the rotary valve for its condition of flow reduced from that of the FIG. 3 condition.

The lower valve-body part 11 provides diametrically opposite inlet and outlet ports 24, 25 to the bore, and in one of its two positions the valve is "open", with valve member 10 providing a straight diametrically extending passage 26 between ports 24, 25, as seen in FIGS. 1 and 3; this will be sometimes referred to as the "full-flow" position of the valve. When motor-actuated to its other position, involving 90° of rotary displacement, the valve member cuts off the passage-26 connection of ports 24, 25; this could be a shut-off condition of the valve, but in FIG. 3A it is seen that an orifice 27 can have been positioned to determine a "reduced-flow" condition of the valve. Preferably, the valve-member passage 28 which extends diametrically and is shown to include orifice 27 is initially a thin solid wall, leaving to the customer the option of either a "shut-off" capability for the FIG. 3A valve-member position, or a particular "reduced-flow" capability, as determined by the size of orifice 27 drilled in this thin wall.

The stator 30 of the DC motor comprises two vertically stacked sets of core laminations which define core halves 31, 32 that are cylindrically arcuate, each extending almost 180°, and spaced by a small gap or blocker angle $\alpha$, such as 5°, at their adjacent ends. A single length of insulated conductor 33 is toroidally wound in one direction of helical advance around the core half 31 for the core span designated A in FIG. 4, and the same single length is continued with toroidal winding in the opposite direction of helical advance around the core half 32, for the core span designated B in FIG. 4. In the drawings, the designations 33A and 33B are used to suggest the oppositely wound (and effectively series-connected) halves of the same winding 33, with two lead wires to a connector 34 for DC excitation from an external source. Thus, for any given polarity of DC excitation of winding 33, the core half 31 will assume polarity opposite to that of the core half 32.

The stator 30 will be seen to complete a cylindrical annulus which seats against a flange formation 35 of the upper body part 12 and which extends axially just short of full concentric overlap of rotor 13. The remaining axial extent of rotor-13 overlap is allocated to an annular ring 36 which locates and retains valve-position latching and sensing means to be later described. The entire motor structure is protected by a cup-shaped housing closure 37 which mounts connector 34 and which has removably sealed fit to the valve-body flange formation 35.

The rotor 13 is an integrated, diametrically polarized, cylindrical structure which is solidly contained within a cladding of non-corrosive material. What has previously been identified as sleeve 22 is seen in the drawings to be a back iron having a rectangular section that is symmetrical about the bore via which it is fitted to the valve-member stem 14. Two like but oppositely and permanently polarized magnet elements 40, 41 are fitted to the long sides of this rectangular back-iron section, thus establishing the diametrically extending polarization of the armature, with cylindrically arcuate convex pole faces which face the respective wound core halves 31, 32 of the stator. Polarity legends in the drawings show permanent magnet 40 providing its arcuate pole face with N polarity for torsional response to excitation of the winding half 33A, while permanent magnet 41 establishes S polarity at its arcuate pole face, for the same direction of torsional response to the oppositely wound winding half 33B.

The remainder of the solid structure of rotor 13 forms no part of magnetic circuitry. Thus, the cylindrical interior of the rotor is completed by like cylindrically arcuate and chordally truncated segments 42 of a material such as aluminum. The cladding of rotor 13 is shown to comprise upper and lower annular end closures 43, 44 of corrosion-resistant material, such as stainless steel, and the outer cylindrical surface of rotor 13 is sheathed in a thin sleeve 45 of corrosion-resistant steel. Circumferential welds of closures 43, 44 to sleeve 45, and to reduced cylindrical axial ends of (inner) sleeve or back iron 22, complete the annular corrosion-protective casing of rotor 13.

Figure 4:
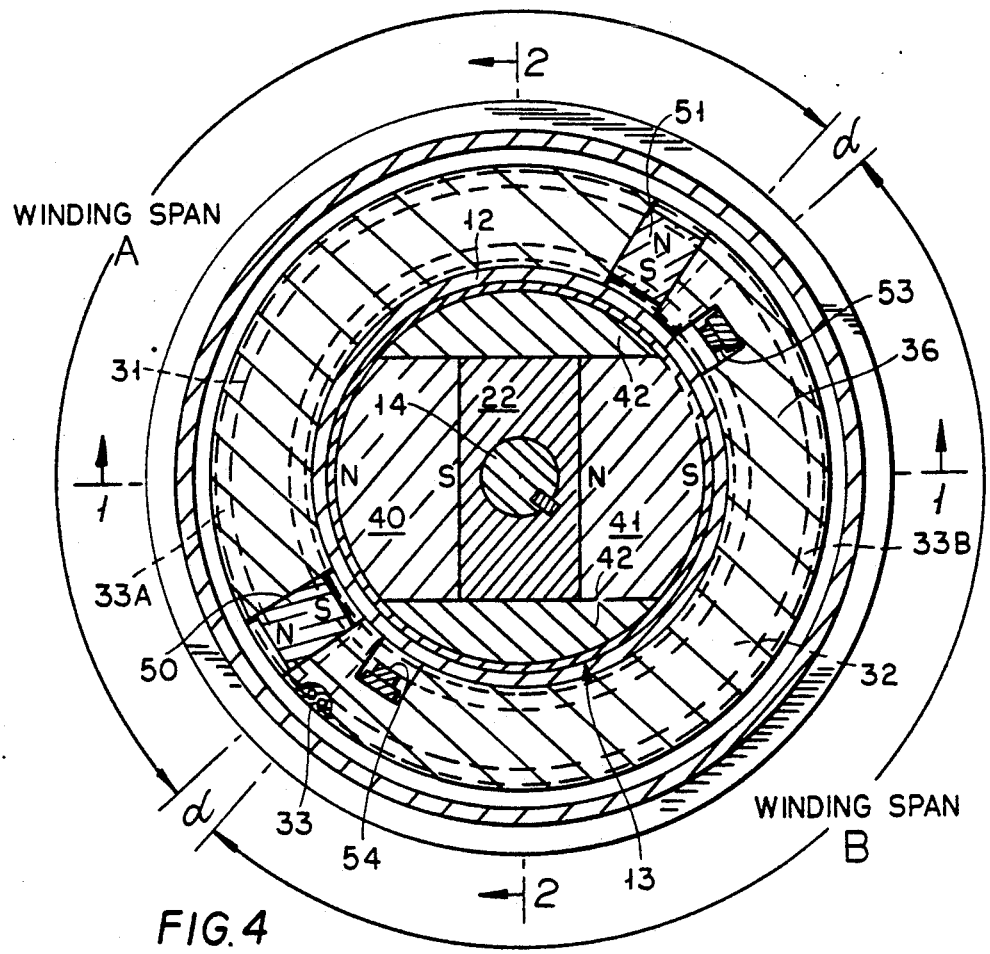
FIG. 4 is a sectional view of the valve of FIG. 1, taken at 4—4 in FIGS. 1 and 2, and showing motor-actuator position for the maximum-flow condition of FIG. 1.
Figure 5:
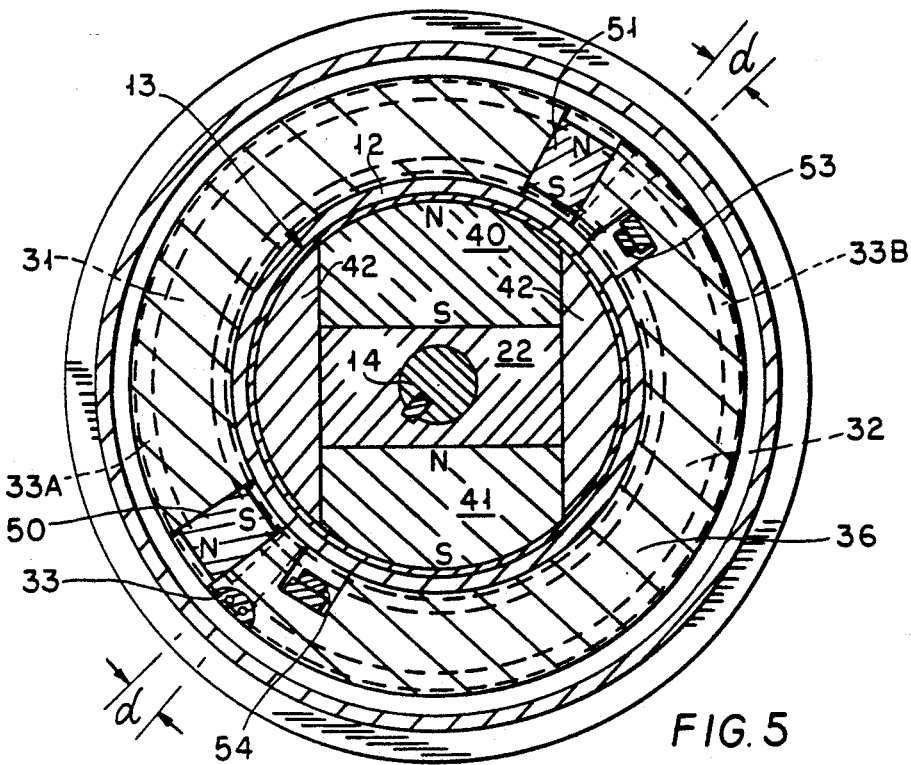
FIG. 5 is a sectional view as in FIG. 4, except that the motor-actuator has been shifted to a position determining less than maximum flow.
Figure 6:
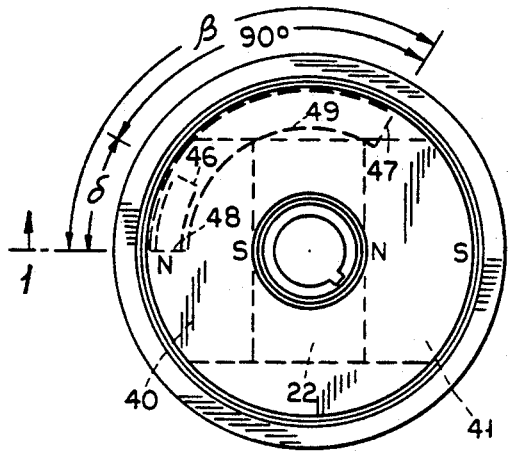
FIG. 6 is a simplified top-plan view of the rotor component of the motor of FIG. 1, with indication at 1—1 of the section plane of FIG. 1.

To assure positive location of the angular limits of the 90° rotary excursion of rotor 13 and valve member 10, from one to the other of the positions shown in FIGS. 4 and 5, a local stop lug 46 is an integral formation extending axially downward from the lower-end closure 44 of rotor 13. The stop lug 46 is seen in FIG. 6 to ride freely within arcuate limits 47, 48 of an arcuate recess 49 which characterizes the upper-end bore profile of the valve-body part 11. The full angular extent $\beta$ of recess 49 is the sum of the effective angular extent $\delta$ of lug 46, plus 90°.

For most effective motor-torque development, the width of pole faces of the armature 40-22-41 should be the maximum, consistent with full pole-face lap of its relevant winding half 33A, 33B, for each of the two rotary positions of the armature and therefore of the valve member. If each winding/core span (A, B) could be 180°, then the pole-face width should subtend an angle approaching 90° about the central axis of the rotor. In the form shown, however, and assuming gaps $\alpha$ of 5°, the pole faces of magnets 40, 41 have a maximum width of approximately 80°. Thus, in FIGS. 4 and 5, the "N" pole face of magnet 40 has the same maximum of coupling to the winding turns at 33A, for the "full-flow" condition of FIG. 4, as it has for the "no-flow" or "low-flow" condition of FIG. 5, depending on whether or not an orifice 27 is provided in the smaller passage 28 of the valve member. The same may be said for the "S" pole face of magnet 41, and its relation to the winding turns 33B. A given polarity of winding-33 excitation will develop equal and balanced torques at the respective pole faces of the armature, to drive rotor 13 from its FIG. 4 position to its FIG. 5 position, and the opposite polarity of winding-33 excitation will similarly develop equal, but directionally opposite, torques at these pole faces of the armature, to drive rotor 13 from its FIG. 5 position and back to its FIG. 4 position. The excitation required in each case is limited in time, according to the magnitude of involved current and the transit time for the involved 90° displacement; the time can be a small fraction of a second.

It is a feature of the invention that magnetic latching is employed for retaining the displacement achieved for each actuation of the valve. To this end, permanently magnetized elements 50, 51 are united to and oriented by the retaining ring 36 (of magnetically transparent material, such as aluminum) which is mounted to the upper axial end of the wound stator 30. As shown, for the FIG. 4 position, magnet 50 is radially oriented and polarized to present its S pole in at least partially coupled relation with the N-pole face of element 40 of the armature, thus establishing an attraction force to bias the rotor stop 46 against the fixed abutment 48 of valve-body part 11; at the same time, magnet 51 is also radially oriented and polarized to present its S pole inwardly, but, to the extent that it has any reaction with the nearest pole-face element of the armature, the relation is one of repulsion, as between the two involved S-pole faces of magnets 41 and 51. Both of the magnets 50, 51 thus make their individual contributions to torsionally bias rotor 13 into the positional limit of 46-48 abutment. On the other hand, when windings 33A, 33B are excited to drive rotor 13 clockwise, from its FIG. 4 position to its FIG. 5 position, the S pole of latching magnet 51 comes into at least partial overlap with the N pole face of the armature magnet 40, to develop attraction torque, holding stop 46 against the fixed abutment 47 of valve-body part 11; at the same time, retention against the fixed abutment 47 is further aided by such repulsion torque as is developed by the S pole (41) of the armature in any proximity to the S pole of latching magnet 50.

It is another feature of the invention that external reporting of the actual instantaneous position of valve member 10 shall be available at all times. To this end, the assembly of ring 36 further incorporates the retention and orientation of two Hall-effect devices 53, 54. These devices 53, 54 are shown in FIGS. 4 and 5 to be positioned at angular locations that are in symmetrical image relation to the angular locations of the latching magnets 50, 51, the plane of symmetry being that geometric plane which includes the central axis of the valve and its rotor and which bisects the gaps $\alpha$ between the half cores 31, 32 of the stator. Each of the Hall-effect devices 53, 54 may suitably be a hermetically sealed magnetic-field detector, type OMH 3019, produced by Optek Technology, Inc., of Carrollton, Tex., namely, a monolithic integrated circuit which incorporates a Hall element, a linear amplifier and Schmitt trigger on a single silicon chip. Separate logic-level outputs from the respective devices 53, 54 will be understood to be accommodated by the multiple-pin capacity of connector 34, for external availability of relevant logic signals.

For the configuration of Hall-effect devices 53, 54 shown in FIGS. 4 and 5, the device 53 will have an output signal reflecting the presence of the S pole of the armature (plus the repulsion-fringe field as between magnets 42-51) while in the FIG. 4 position; at the same time, the device 54 will be out of any fringe field associated with magnets 40-50, in view of their attraction mode, and in view of an angular offset which precludes any possible overlap of device 54 with magnet 40. The FIG. 4 relationship is thus externally communicated with no ambiguity. On the other hand, in the FIG. 5 relationship, the positional relationships of devices 53, 54 is reversed, with device 54 in partial overlap with the S pole face of the armature, and device 53 in angular offset from magnets 40-51 which are in their attraction mode; this being the case, the FIG. 5 relationship is externally communicated with no ambiguity.

The described valve and its motor configuration have been described for the two-position function which represents an absolute minimum of power requirements. And it will be understood that with more available power, the configuration and functional operation can be quite different. For example, once winding 33 has been excited to effect a rotor displacement of 90°, a reduced level of winding 33 excitation with the same polarity can develop enough torque to hold the new position of stop engagement, in which case, latching magnets 50, 51 are not needed.

Figure 7:
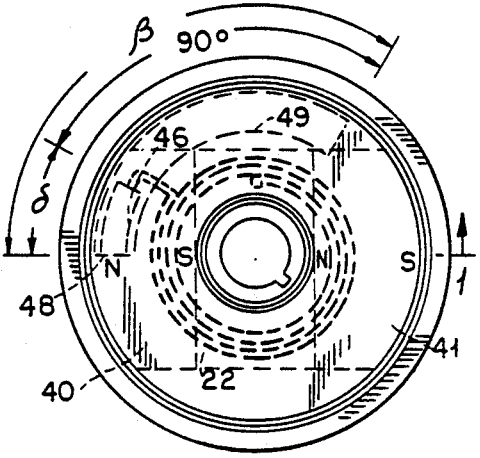
FIG. 7 is a view similar to FIG. 6, to show a modification.

Also, for example, as suggested in FIG. 7, a clock spring 55, internally referenced to the lower body part 11, can apply a biasing torque (via its outer end 56) to the stop element 46 of rotor 13. In that case, the bias torque of spring 55 continuously urges stop 46 against abutment 48, and in any stator excitation to displace rotor 13 away from this position, the magnitude of the excitation will determine the displacement angle, due to the fact that the spring constant applies increasing bias torque, as the excitation level increases. There thus results a proportional control valve, wherein excitation level determines displacement angle. And it will be understood that if the orientation of spring 55 is reversed, its bias would oppose counterclockwise displacement of stop 46 away from the other limiting abutment, at 47.

Still further, the winding turns developed over the respective arcs of the stator halves A, B may each be characterized as to number of turns per unit angle of departure from a reference position, so that motor torque can be either a flat characteristic over the full limited angular excursion, or it may be a particularly characterized function of angular displacement, for a particular application purpose.

Figure 8:
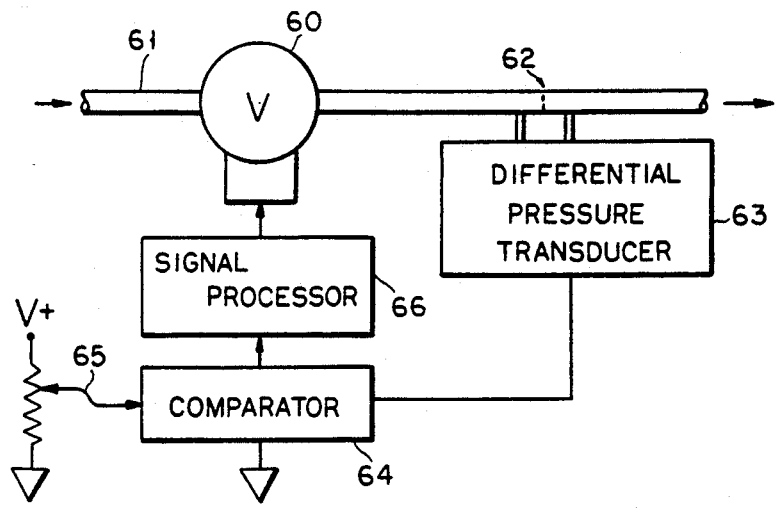
FIG. 8 is a simplified schematic diagram to show the valve of FIGS. 1 to 6, with or without the modification of FIG. 7, in a feedback-control utilization of the valve.

It is to be noted that the described valves lend themselves to regulating-valve and feedback controlled application, an illustrative feedback situation being schematically shown in FIG. 8, wherein a valve 60 of the invention is in a line 61 of pressure-fluid flow, with a flow-metering orifice 62 downstream from the valve. A differential-pressure transducer 63 monitors flow by responding to the pressure drop across orifice 62, and the electrical signal which reflects this flow is applied to a comparator 64, which has been set by means 65 to control a particular flow rate via valve 60. The output signal of the comparator is a signal which reflects any adjustment that may be necessary at valve 60, and a signal processor 66 is shown for suitably characterizing the comparator-output signal, for purposes of correctively operating valve 60. If valve 60 is of the two-position variety described in connection with FIGS. 1 to 6, then the signal processor 66 will be understood to apply a succession of "bang-bang" signals to the winding 33 of valve 60, wherein the predominant allocation of time pulses of one or the other polarity will determine the net open/closed (or open/reduced-flow) condition of the valve. On the other hand, the proportional control available with a spring bias as discussed in connection with FIG. 7 will permit use of an analog control signal from processor 66 to the winding 33 of valve 60.

It has been indicated that, in its preferred embodiment, the rotor 13 is clad with corrosion-resistant material. This is for the purpose of protecting the permanent magnets 40, 41 which are suitably of samarium cobalt (SmCo) or Neodymium Iron Boron (NeFeB) material. The back iron 22 is a corrosion-resistant ferromagnetic material, such as 430 CRES or E-Brite 26-1. The end closures 43, 44 and sleeve 45 which complete the cladding of rotor 13 are of a non-magnetic austenitic CRES, such as 304 L CRES, that is welded to the back iron 22, to establish complete protective coverage of the armature.

For the preferred embodiment wherein power requirements are reduced to a minimum and wherein there is to be an absolute minimum of frictional interference with rotor displacements, a running clearance relation exists between valve member 10 and the bore of the body part 11 in which it operates. This clearance is preferably such that even in a full shut-off or reduced-flow condition of the valve, there is always a bleed flow of fluid from inlet 24 to outlet 25. Consistent with this preference, it will be noted that all of the antifriction bearings are free of seals and are therefore exposed to the fluid handled by the valve; and that body part 11 includes a passage 67 to assure free-flooding of the interior of the valve body. The use of corrosion-resistant cladding of the rotor and corrosion-resistant material in the body parts 11, 12 provides assurance that the indicated requirements are met, even when the fluid is inherently corrosive.

The laminations of the stator stacks 31, 32 are preferably of a high magnetic-induction material, such as M9 electrical steel, bonded to each other.

For a specific application of the two-position valve of FIGS. 1 to 6, in which rotor diameter is 3 inches and valve-member diameter is 7/8 inch, motor torque is at least 1 in.-lb., latching torque is 0.25 in.-lb., response time is 35 milliseconds for the full 90° displacement, and power consumption is 49 watts, for each such 90° actuation.

The described invention will be seen to achieve all stated objects, realizing economies of power and reliability of operation, coupled with external assurance of the operating state of the valve at all times, and in the event of using the valve as a modulator (as in FIG. 7), the ring 36 will be understood to accommodate such further Hall-effect devices as may be desired to report externally any particular one or more angular positions of valve member 10, between the limiting-stop engagements described at 47, 48.

What is claimed is:

1. A motor-operated valve, comprising a body having inlet and outlet ports to a bore on a central axis, a valve member journalled in said body for rotation about said axis, said valve member in a first rotary position establishing a maximum-flow passage between said ports and in a rotary position offset from said first position establishing a minimum-flow passage between said ports, and a toroidal-torque motor centered on said axis and having a stator fixed to said body and a rotor in angularly fixed connection to said valve member to directly impart rotation to said valve member over a limited angular excursion; said rotor comprising a diametrically extending magnetically polarized armature presenting to said stator diametrically opposed first and second pole faces, first and second angularly spaced polarized latching magnets fixed to said stator at such locations with respect to said angular excursion that in one of said valve-member positions one to the exclusion of the other of said latching magnets reacts with one of said pole faces to retain said first valve-member position, and such that in the other of said valve-member positions the other to the exclusion of said one latching magnet similarly reacts with said one pole face to retain said second valve-member position.

2. The valve of claim 1, in which abutment-stop means coacting between said rotor and said housing establish a first limit of said angular excursion, and in which torsionally operative spring means coacting between said rotor and said housing establish an increasing torsional moment in opposition to motor-driven displacement of said valve member away from said first limit.

3. The valve of claim 1, in which abutment-stop means coacting between said rotor and said housing establish positive 90°-spaced limits of said angular excursion.

4. The valve of claim 1, in which said rotor comprises a diametrically extending magnetically polarized armature presenting to said stator diametrically opposed pole faces, and at least one Hall-effect device fixed to said stator at such angular relation with respect to said angular excursion that said Hall-effect device is in at least partial angular overlap with one of said pole faces only when said valve member is in said first position.

5. A two-position motor-operated valve comprising a body having inlet and outlet ports to a bore on a central axis, a valve member journalled in said body for rotation about said axis, said valve member in a first rotary position establishing a first passage between said ports and in a second rotary position establishing a second passage including a bleed-orifice communication between said ports, and a toroidal-torque motor centered on said axis and having a stator fixed to said body and a rotor connected to impart rotation to said valve member over a limited angular excursion between said first and said second rotary positions; said rotor comprising a diametrically extending magnetically polarized armature presenting to said stator diametrically opposed first and second pole faces, first and second angularly spaced polarized latching magnets fixed to said stator at such locations with respect to said angular excursion that in one of said valve-member positions one to the exclusion of the other of said latching magnets reacts with one of said pole faces to retain said first valve-member position, and such that in the other of said valve-member positions the other to the exclusion of said one latching magnet similarly reacts with said one pole face to retain said second valve-member position.

6. A two-position motor-operated valve comprising a body having inlet and outlet ports to a bore on a central axis, a valve member journalled in said body for rotation about said axis, said valve member in a first rotary position establishing a first passage between said ports and in a second rotary position establishing a second passage including a bleed-orifice communication between said ports, and a toroidal-torque motor centered on said axis and having a stator fixed to said body and a rotor connected to impart rotation to said valve member over a limited angular excursion between said first and said second rotary positions; said rotor comprising a diametrically extending magnetically polarized armature presenting to said stator diametrically opposed pole faces, first and second angularly spaced Hall-effect devices fixed to said stator at such angular locations with respect to said angular excursion that in one of said valve-member positions the magnetic-field response of one to the exclusion of the other of said Hall-effect devices is in at least partial angular overlap with one of said pole faces, and such that in the other of said valve-member positions the magnetic-field response of the other to the exclusion of said one Hall-effect device is in at least partial angular overlap with said one pole face.

7. The valve of claim 1 or claim 5 or claim 6, in which abutment-stop means coacting between said rotor and said housing establish positive limits of said angular excursion.

8. The valve of claim 6, in which in said first valve-member position said other Hall-effect device is offset from any angular overlap with either of said pole faces, and in which in said second valve-member position said one Hall-effect device is offset from any angular overlap with either of said pole faces.

9. The valve of claim 1 or claim 5 or claim 6, in which said limited angular excursion is 90 degrees and said ports are in diametrically opposed communication with said bore.

10. The valve of claim 1 or claim 5 or claim 6, in which said valve member includes an elongate stem keyed to and extending beyond axial limits of said rotor, and in which journalled support of said valve member includes first and second antifriction bearings mounted within said body in axially outward adjacency to the axial limits of said rotor.

11. The valve of claim 1 or claim 5 or claim 6, in which said valve member includes an elongate stem keyed to and extending beyond axial limits of said rotor, in which journalled support of said valve member includes first and second antifriction bearings mounted within said body in axially outward adjacency to the axial limits of said rotor, and in which one of said bearings is axially between said rotor and the passages of said valve member.

12. The valve of claim 1 or claim 5 or claim 6, in which said valve member includes an elongate stem keyed to and extending beyond axial limits of said rotor, in which journalled support of said valve member includes first and second antifriction bearings mounted within said body in axially outward adjacency to the axial limits of said rotor, in which one of said bearings is axially between said rotor and the passages of said valve member, and in which a third antifriction bearing mounts said valve member to said body at an axial location that is on the other axial side of the passages of said valve member.

13. The valve of claim 1 or claim 5 or claim 6, in which said valve member includes an elongate stem which mounts said armature, and in which said rotor is clad with corrosion-resistant material, said cladding material being hermetically sealed to said stem.

14. The valve of claim 1 or claim 5 or claim 6, in which said valve member includes an elongate stem keyed to and extending beyond axial limits of said rotor, in which journalled support of said valve member includes first and second antifriction bearings mounted within said body in axially outward adjacency to the axial limits of said rotor, in which said rotor is clad with corrosion-resistant material which is hermetically sealed to said stem between each axial end of the rotor and each of said bearings, and in which said body is a sealed enclosure of corrosion-resistant material enclosing said bearings and said rotor and said valve member, said stator being externally mounted to said body.

15. The valve of claim 1 or claim 5 or claim 6, in which said valve member has unsealed running clearance with the body bore, whereby said running clearance establishes a bleed path for hydraulic fluid around said valve member.

16. The valve of claim 1, in which said rotor comprises a diametrically extending magnetically polarized armature presenting to said stator diametrically opposed first and second pole faces of opposite polarity, each of said pole faces having an effective angular width approaching 90° about said axis, and a stator comprising a toroidally wound cylindrical annular core concentric with said axis and in clearance with rotary displaceability of said rotor, said core having diametrically opposed barriers whereby separate substantially semi-cylindrical halves may be oppositely polarized, and the winding of said core having equal numbers of conductive turns distributed over each of said halves, but with oppositely directed helical advance of the turns in the respective halves, and limit-stop formations coacting between said rotor and said body for so positioning said excursion that one armature pole sweeps only the conductive turns of one core half and the other armature pole sweeps only the conductive turns of the other core half.

17. A two-position motor-operated valve comprising a body having inlet and outlet ports to a bore on a central axis, a valve member journalled for rotation in said body and between angularly spaced limits of angular displacement about said axis, said valve member establishing different flow-passage connection of said ports when at one or the other of said limits, a rotary-torque motor comprising a stator carried by said body and a rotor mounted to said valve member, said motor having means for excitation to develop torque for rotor displacement between one and the other of said limits, first permanent-magnet latching means operative to retain said rotor at one of said limits and second permanent-magnet latching means operative to retain said rotor at the other of said limits, whereby said rotor can be retained at either of said limits without continuous application of excitation power.

18. A two-position motor-operated valve comprising a body having inlet and outlet ports to a bore on a central axis, a valve member journalled for rotation in said body and between angularly spaced limits of angular displacement about said axis, said valve member establishing different flow-passage connection of said ports when at one or the other of said limits, a rotary-torque motor comprising a stator carried by said body and a rotor mounted to said valve member, said rotor comprising a diametrically extending magnetically polarized armature presenting to said stator diametrically opposed pole faces, first and second angularly spaced Hall-effect devices fixed to said stator at such angular locations with respect to said limits of angular displacement that when at one rotor-limit position the magnetic-field response of one to the exclusion of the other of said Hall-effect devices is in at least partial overlap with one of said pole faces, and such that at the other rotor-limit position the magnetic-field response of the other to the exclusion of said one Hall-effect device is in at least partial angular overlap with said one pole face.

19. The valve of claim 18, in which at said one rotor-limit position, said other Hall-effect device is offset from any angular overlap with either of said pole faces, and in which in the other rotor-limit position said one Hall-effect device is offset from any angular overlap with either of said pole faces.

20. The valve of claim 1 or claim 5 or claim 6, in which said valve member includes an elongate stem keyed to and extending beyond axial limits of said rotor, in which journalled support of said valve member includes first and second unsealed antifriction bearings mounted within said body in axially outward adjacency to the axial limits of said rotor, in which said rotor is clad with corrosion-resistant material which is hermetically sealed to said stem between each axial end of the rotor and each of said bearings, and in which said body is a sealed enclosure of corrosion-resistant material enclosing said bearings and said rotor and said valve member, said stator being externally mounted to said body.

* * * * *